US006238725B1

(12) United States Patent
Bush et al.

(10) Patent No.: US 6,238,725 B1
(45) Date of Patent: May 29, 2001

(54) PROCESS FOR REMOVING FLATULENCE-CAUSING OLIGOSACCHARIDES IN LEGUMES

(75) Inventors: Condon S. Bush, Knoxville, TN (US); Griscom Bettle, III, Sarasota, FL (US); Joseph L. Rutzinski, Morristown, TN (US)

(73) Assignee: Bush Brothers & Company, Knoxville, TN (US)

( * ) Notice: Subject to any disclaimer, the term of this patent is extended or adjusted under 35 U.S.C. 154(b) by 0 days.

(21) Appl. No.: 09/236,313

(22) Filed: Jan. 22, 1999

Related U.S. Application Data

(60) Provisional application No. 60/072,183, filed on Jan. 22, 1998.

(51) Int. Cl.$^7$ .................. A23L 1/20; A23L 1/06
(52) U.S. Cl. ............. 426/634; 426/507; 426/431; 426/478
(58) Field of Search ................ 426/634, 507, 426/431, 478

(56) References Cited

U.S. PATENT DOCUMENTS

| | | |
|---|---|---|
| 1,495,736 | 5/1924 | Hadley . |
| 1,548,796 | 8/1925 | Libby . |
| 1,718,187 | 6/1929 | Bartlett . |
| 1,813,268 | 7/1931 | Bachler . |
| 2,232,282 | 2/1941 | Struble . |
| 2,278,475 | 4/1942 | Musher . |
| 2,360,062 | 10/1944 | Lannen . |
| 2,952,543 | 9/1960 | Szczesniak et al. . |
| 3,126,285 | 3/1964 | Lippold . |
| 3,220,451 | 11/1965 | Bollens et al. . |
| 3,253,930 | 5/1966 | Gould et al. . |
| 3,290,159 | 12/1966 | Dorsey et al. . |
| 3,364,034 | 1/1968 | Hoersch et al. . |
| 3,594,184 | 7/1971 | Hawley et al. . |
| 3,594,185 | 7/1971 | Hawley et al. . |
| 3,594,186 | 7/1971 | Hawley et al. . |
| 3,598,610 | 8/1971 | Hawley et al. . |
| 3,632,346 | 1/1972 | Sherba . |
| 3,869,556 | 3/1975 | Rockland et al. . |
| 3,876,807 | 4/1975 | Wagner et al. . |
| 3,971,856 | 7/1976 | Daftary . |
| 3,973,047 | 8/1976 | Linaberry et al. . |
| 4,064,277 | 12/1977 | Yokotsuka et al. . |
| 4,194,016 | 3/1980 | Weaver et al. . |
| 4,216,235 | 8/1980 | Dasek et al. . |
| 4,333,955 | 6/1982 | Murata et al. . |
| 4,376,127 | 3/1983 | Lunde . |
| 4,376,128 | 3/1983 | Lunde . |
| 4,407,840 | 10/1983 | Lathrop et al. . |
| 4,483,874 | 11/1984 | Olsen . |
| 4,645,677 | 2/1987 | Lawhon et al. . |
| 4,729,901 | 3/1988 | Rockland et al. . |
| 4,871,567 | 10/1989 | Sterner et al. . |
| 4,908,224 | 3/1990 | Yoder . |
| 5,100,679 | 3/1992 | Delrue . |
| 5,436,003 | 7/1995 | Rohde, Jr. et al. . |
| 5,445,957 | 8/1995 | Rohde, Jr. et al. . |
| 5,545,425 | 8/1996 | Wu . |
| 5,599,572 | 2/1997 | Bourne . |
| 5,607,712 | 3/1997 | Bourne . |

(List continued on next page.)

OTHER PUBLICATIONS

Stone, M., et al. "The Brilliant Bean" A Bantam Book, Feb. 1988, pp. 9–30, 136, and 154.

(List continued on next page.)

*Primary Examiner*—Anthony J. Weier
(74) *Attorney, Agent, or Firm*—Scully, Scott, Murphy & Presser

(57) ABSTRACT

The present invention is directed to a method of preparing a legume in which the flatulence-causing oligosaccharides are removed. It is also directed to a process for reducing the flatulence of a flatulence-causing legume.

20 Claims, 2 Drawing Sheets

U.S. PATENT DOCUMENTS

| | | |
|---|---|---|
| 5,645,879 | 7/1997 | Bourne . |
| 5,648,210 | 7/1997 | Kerr et al. . |
| 5,651,967 | 7/1997 | Rohde, Jr. et al. . |
| 5,710,365 | 1/1998 | Kerr et al. . |
| 5,773,699 | 6/1998 | Kerr et al. . |
| 5,863,591 * | 1/1999 | Sequin .................................. 426/634 |
| 5,871,801 | 2/1999 | Kazemzadeh . |

OTHER PUBLICATIONS

Abdel–Gawad, A.S., "Effect of domestic processing on oligosaccharide content of some dry legume seeds," *Food Chemistry*, vol. 46, (1993), pp. 25–31.

"The International Dry Bean Symposium," Michigan State University, Michigan Bean Commission, Michigan Bean Shippers Association, Aug. 22–24, 1972.

Borejszo, Z., et al., "Reduction of Flatulence–Causing Sugars by High Temperature Extrusion of Pinto Bean High Starch Fractions," *Journal of Food Science*, vol. 57(3), (1992), pp. 771–772.

Calloway, D.H., et al., "Reduction of Intestinal Gas–Forming Properties of Legumes by Traditional and Experimental Food Processing Methods," *Journal of Food Science*, vol. 36, (1971), pp. 251–255.

Fleming, S.E., "Flatulence Activity of the Smooth–Seeded Field Pea as Indicated by Hydrogen Production in the Rat," *Journal of Food Science*, vol. 47, (1981), pp. 12–15.

Fleming, S.E., "A Study of Relationships Between Flatus Potential and Carbohydrate Distribution in Legume Seeds," *Journal of Food Science*, vol. 46, (1981), pp. 794–803.

Fyfield, T.P., et al., "Effects of Temperature and Water Potential on Germination, Radicle Elongation and Emergence of Mungbean," *Journal of Experimental Botany*, vol. 40(215), Jun. 1989, pp. 667–674.

Ganiats, T.G., et al., "Does Beano Prevent Gas? A Double--blind Crossover Study of Oral α–Galactosidase to Treat Dietary Oligosaccharide Intolerance," *The Journal of Family Practice*, vol. 39(5), Nov. 1994, pp. 441–445.

Goel, R., et al., "Removal of Flatulence Factor of Some Pulses by Microbial Fermentation," *The Ind. J. Nutr. Dietet.*, vol. 18, (1980), pp. 215–217.

Hsu, D., et al., "Effect of Germination on Nutritive Value and Baking Properties of Dry Peas, Lentils, and Faba Beans," *Journal of Food Science*, vol. 45, (1980), pp. 87–92.

Iyer, V., et al., "Quick–cooking beans (*Phaseolus vulgaris* L.): I. Investigations on quality," *Qual. Plant Plant Foods Hum. Nutr.*, vol. 30, (1980), pp. 27–43.

Kinsella, J.E., "Functional Properties of Proteins in Foods: A Survey," *Critical Reviews in Food Science and Nutrition*, Apr. 1976, pp. 219–280.

Khokhar, S., et al., "Physico–Chemical Characteristics of Khesari Dhal (*Lathyrus sativus*): Changes in α–Galactosides, Monosaccharides and Disaccharides during Food Processing," *J. Sci. Food Agric.*, vol. 70, (1996), pp. 487–492.

Ingrassia, L., "Dr. Colin Leakey, A Real Bean Counter, Finds Profit Elusive," *The Wall Street Journal*, Apr. 1, 1997, p. 1.

Leakey, C.L.A., et al., "Beans, Fibre, Health and Gas," *Agri–Food Quality: an Interdisplinary Approach*, pp. 175–180.

Liu, K., et al., "Mechanism of Hard–to–Cook Defect in Cowpeas: Verification Via Microstructure Examination," *Food Structure*, vol. 12, (1993), pp. 51–58.

de Lumen, B.O., "Molecular Strategies to Improve Protein Quality and Reduce Flatulence in Legumes: A Review," *Food Structure*, vol. 11, (1992), pp. 33–46.

Mulimani, V.H., et al., "Enzymatic degradation of oligosaccharides in soybean flours," *Food Chemistry*, vol. 59(2), (1997), pp. 279–282.

Obendorf, R., "Oligosaccharides and galactosyl cyclitols in seed desiccation tolerance," *Seed Science Research*, vol. 7, (1997), pp. 63–74.

Olson, A.C., et al., "Flatus Causing Factors in Legumes," *Antinutrients and Natural Toxicants in Foods*, Food & Nutrition Press, Inc., (1981), pp. 275–294.

Abstract of Papers, Olson, A.C., "Flatus Causing Factors in Legumes," *American Chemical Society*, vol. 177(1), p. 37.

Powers, J.J., et al., "Gelation of Canned Peas and Pinto Beans as Influenced by Processing Conditions, Starch and Pectic Content," *Food Technology*, Feb. 1961, pp. 41–47.

Price, K.R., et al., "Flatulence—Causes, relation to diet and remedies," *Die Nahrung*, vol. 32(6), (1988), pp. 609–626.

Rao, V.S., et al., "Effects of Gamma–Irradiation on Flatulence–Causing Oligosaccharides in Green Gram (*Phaseolus Areus*)," *Journal of Food Science*, vol. 48, (1983), pp. 1791–1795.

Schoch, T.J., et al., "Preparation and Properties of Various Legume Starches," Nov. 1968, pp. 565–573.

Naczk, M., et al., "α–Galactosides of Sucrose in Foods: Composition, Flatulence–Causing Effects, and Removal," *American Chemical Society*, ACS Symposium Series 662, pp. 127–151.

Sathe, S.K., et al., "Dry Beans of Phaseolus. A review. Part 2. Chemical Composition: Carbohydrates, Fiber, Minerals, Vitamins and Lipids," *CRC Critical Reviews in Food Science and Nutrition*, vol. 21(1), pp. 41–93.

Sathe, S.K., et al., "Technology of Removal of Unwanted Components of Dry Beans," *CRC Critical Reviews in Food Science and Nutrition*, vol. 21(3), pp. 263–287.

Ku, S., et al., "Extraction of Oligosaccharides During Cooking of Whole Soybeans," *Journal of Food Science*, vol. 41, (1976), pp. 361–364.

Uebersax, M.A., et al., "Strategies and Procedures for Processing Dry Beans," *Food Technology*, Sep. 1991, pp. 104–110.

Kon, S., "Pectic Substances of Dry Beans and Their Possible Correlation with Cooking Time," *Journal of Food Science*, vol. 33, (1968), pp. 437–438.

Vidal–Valverde, C., et al., "Changes in the carbohydrate composition of legumes after soaking and cooking," *Journal of the American Dietetic Association*, vol. 93(5), May 1993, pp. 547–550.

"Flatulence Problem," *CRC Handbook of World Food Legumes*, vol. 1, pp. 64–74.

Chung, Y., Dissertion: "Changes in Cell Wall Structure and Starch Digestibility During Cooking of Dry Bean (*Phaseolus Vulgaris* L.)," Michigan State University, 1996.

King, M.M., Dissertion: "Alpha–Galactosidase Activity and Oligosaccharide Hydrolysis in cowpea (*Vigna Unguiculata* L. Walp) Seeds and Flour)," University of Arkansas, May 1987.

* cited by examiner

PROCESS FOR REMOVING FLATULENCE-CAUSING OLIGOSACCHARIDES IN LEGUMES

RELATED APPLICATION

The present application is claiming benefit of provisional application 60/072,183, filed on Jan. 22, 1998

FIELD OF THE INVENTION

The present invention relates to a process for preparing legumes exhibiting reduced flatulence when digested by mammals and a process for reducing flatulence in legumes when digested by mammals and the products thus prepared.

BACKGROUND OF THE INVENTION

Legumes are important foodstuffs and are likely to become more so in the future. For example, many legumes, especially those in some of the legume genuses, such as Phaseolus, Soja and Lens, are high in protein and provide an inexpensive alternative to animal protein.

Unfortunately, ingestion of some of the most nutritious and abundant legumes can be accompanied by severe flatulence as well as abdominal distress and poor digestibility. More specifically, the flatulence results in discomfort, diarrhea, loss of appetite, and poor growth, all of which have prevented the wide-scale use of these vegetable nutrients.

It is believed that the flatulence is attributable in part to the indigestibility by mammalian digestive enzymes of the flatulence-causing alpha oligosaccharides, such as raffinose, stachyose, and verbascose, and the like, present in legume products. The generally accepted explanation of the action of the alpha oligosaccharides in producing flatulence is that the enzyme alpha galactosidase, which hydrolyzes the α-oligosaccharides, is not present in the intestinal tract of mammals. Thus, these compounds are not hydrolyzed and dissolved in the digestive tract so that they can be absorbed. Instead, they reach the lower intestine essentially intact. Here, anaerobic bacteria ferment these sugars with the resultant production of carbon dioxide, hydrogen, and methane gases, thereby producing flatus.

Various solutions have been proposed to remove the oligosaccharides from legumes. More specifically, many proposed solutions relate to the use of enzymes to enhance the digestibility of the oligosaccharides. Thus, one solution is to add oligosaccharide-digesting enzymes to the legume itself or as a food supplement to be ingested substantially simultaneously with the ingestion of the legume. For example, U.S. Pat. No. 3,632,646 to Sherba discloses the addition to foodstuff, such as legumes, of α-galactosidases or other enzyme preparations capable of hydrolyzing the 1,6-linkages of stachyose and other food containing flatulence-causing polysaccharides. U.S. Pat. Nos. 4,376,127 and 4,376,128 to Lunde disclose a process of improving the digestibility of legumes and reducing the flatulence thereof by adding an enzyme system found in pineapple and papaya to the legumes prior to cooking said legumes. U.S. Pat. No. 5,651,967 to Rohde, Jr., et al. discloses a food supplement comprising a beta-fructofuranosidase which is alleged to enhance the digestibility of sugars and reduce flatulence. U.S. Pat. Nos. 5,445,957 and 5,651,967 disclose a food supplement to be ingested simultaneously with the legume comprising a beta-fructofurnanosidase enzyme, a cellulose enzyme and a hemicellulose enzyme which together alleviate gastrointestinal distress caused from the digestion of legumes.

Another solution is leaching the oligosaccharides from the legumes. For example, one method is to soak the legume product in water. Sometimes, the soak is in hot water that gradually cools as the soaking progresses. The soaking water may or may not be changed with fresh water. By this method, it has been found that soaking significantly decreases the α-galactoside content in lentils. (See, Frias, et al, *Journal of Food Protection,* 1995, 58, 692–695.) In addition, it has been found that cooking, by either boiling or pressure cooking, also decreases the α-galactoside content. (See, Vidal-Valverde, et al., *Journal of American Dietetic Association,* 1993, 93, 547–550).

Industrial soaking, which can be used to leach the oligosaccharides from the legumes, falls into two main processes. The most practiced is an ambient or initially warm soak that is allowed to cool naturally for several hours, followed by a very short blanch at typically 180° F. The high controlled temperature blanch is used to optimize initial rehydration, deaerate the legumes and coagulate the protein to prevent starch leaching out of the legumes during cooking.

A second industrial process is to use multiple short soak times at temperatures sufficient to accelerate the rehydration process. In this process, the legumes are heated in a series of blanchers.

In the Ph.D. thesis of Matrid King from the University of Arkansas (1987), the use of endogenous α-galactosidase in cowpeas was explored for the purpose of removing the flatulence-causing oligosaccharides therefrom. For example, soaking, germination, and fermentative and non-fermentative incubation treatments for stimulating α-galactosidase hydrolysis of the oligosaccharides were investigated. The thesis disclosed that the enzyme activity of the α-galactosidase increased until a temperature maximum of 113° F. was obtained, i.e., above this temperature the enzyme activity decreased. For example, a two minute incubation at 50° C. (122° F.), 55° C. (129° F.) and 60° C. (140° F.) resulted in a 50, 70 and 90% loss of activity compared to the activity at 113° F. In addition, King disclosed that endogenous α-galactosidase has maximum enzymatic activity at a pH ranging between 4.0 and 5.0.

However, no one heretofore suggested utilizing both leaching action and enzymatic hydrolysis to remove these flatulence causing sugars from legumes. Moreover, no one heretofore suggested removing the sugars at neutral or slightly basic conditions or at temperatures greater than 125° F. Moreover, heretofore, no one had found a method of removing substantially all of the flatulence-causing oligosaccharides from the legumes.

The present inventors have found such a solution. More specifically, they have found a means of significantly removing the flatulence causing oligosaccharides found in legumes.

SUMMARY OF THE INVENTION

The present invention is directed to a process for removing flatulence-causing oligosaccharides from legumes in mammals, which process comprises:

(1) soaking a legume in a water bath in stagnant, sprayed or flowing water at a first temperature which is at or above ambient temperature and below the critical rehydration temperature of the legume under conditions effective and for a period of time sufficient to produce a rehydrated legume having a moisture content of at least about 50% of that of a fully hydrated legume;

(2) soaking and heating the rehydrated legume of step (a) to a second temperature at a pH ranging from about 5.5 to about 9.0 under conditions effective to substantially remove all of the flatulence-causing oligosaccharides therefrom, said second temperature being greater than the critical rehydration temperature and said first temperature, but less than the inactivation temperature of an oligosaccharide reducing enzyme present in the legume; and (3) optionally blanching the product of step (2) at a blanching effective temperature, said blanching effective temperature being greater than the first and second temperatures.

The present invention is also directed to the preparation of a legume exhibiting reduced flatulence when digested by a mammal, which comprises repeating steps (1)–(2) hereinabove, and optionally step (3) and then (4) mixing the legume thus treated with a food acceptable vehicle to form a legume-based mixture; and (5) treating the product of step (4) under the desired preservation methods.

The present invention is also directed to the product thus formed by the processes described hereinabove.

DETAILED DESCRIPTION OF THE INVENTION

Figure 1:
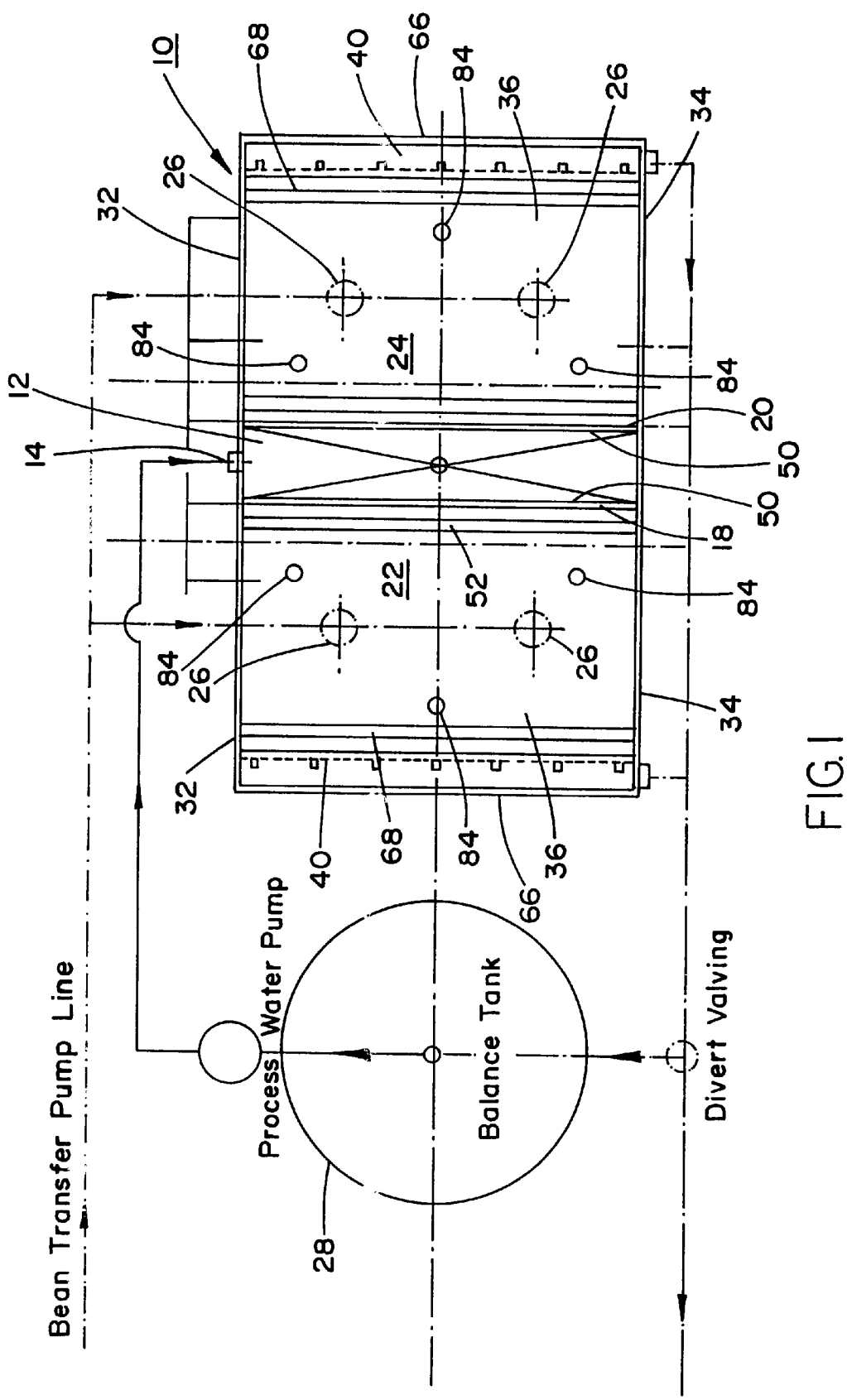
FIG. 1 illustrates, generally diagrammatically, a top plan view of a horizontal flow soak tank system.

As used herein, the term "legume" refers to a vegetable belonging to the family Leguminosae. It is characterized as having a dry, dehiscent fruit derived from a single, simple pistil. When mature, it splits along both dorsal and ventral sutures into two valves. The family Leguminosae characteristically contains a single row of seeds attached along the lower or ventral suture of the fruit. The present invention contemplates the use of the variety of legume seeds comprising the family Leguminosae, but preferably the legume seeds used in the present invention are the usual dry seeds available in commerce. For example, in the case of beans, these products are referred to as dry beans because the product includes only the mature seeds, the pods having been removed. Examples of legume seeds useful in the present invention include seeds of the genus Phaseolus, including, without limitation, the common beans such as large white or Great Northern, small white, pinto, red kidney, black, calico, pink cranberry, red mexican, brown, bayo, lima, navy and the like; the genus Pisum, including, without limitation, smooth and wrinkled peas and yellow or green varieties and the like; the genus Vigna, including the black eye beans (or black eye peas as they are sometimes termed), cowpeas, purple hull peas, cream peas, crowder peas, field peas and the like; the genus Lens, including without limitation, lentils; the genus Cicer, including, without limitation, garbanzo beans and chick peas; the genus Soja, including, without limitation, soybeans; and the like. Other examples of legume seeds useful in the present invention include, red beans, yellow-eye beans, azuki beans, mung beans, tepary beans, and fava beans and the like. The preferred legumes are those from the genus Phaseolus, Cicer, and Vigna. The more preferred legumes are navy beans, pinto beans, kidney beans, large white or Great Northern beans, small white beans, black beans, red beans, pink beans, lima beans, lentil, cow peas, soybean, black-eye peas, field peas, garbanzo beans and chick peas. The most preferred legumes are beans, especially navy beans, pinto beans, and kidney beans.

As defined herein, the term "naturally occurring oligosaccharide reducing enzyme" is the enzyme naturally present in the legume which is capable of digesting the flatulence-causing oligosaccharides, as defined herein. Without wishing to be bound it is believed that in beans, especially, navy beans, this enzyme is α-galactocidase.

"Flatulence-causing oligosaccharides", as defined herein, are oligosaccharides that are not digestible by the mammal and cause flatulence as a result therefrom. They are not simple sugars, but include trisaccharides and higher saccharides. Examples include raffinose, stachyose, verbascose, and the like.

As described hereinabove, aspects of the present invention are directed to a process of reducing flatulence in mammals when digesting legumes and a process of preparing legumes exhibiting this reduced flatulence when digested by mammals. The term "mammals" includes any species of the class Mammalia of higher vertebrates which are characterized by, inter alia, being warm blooded, having mammary glands, and having a body covered by hair. Examples include man, dog, cat, horse, pig, cow and the like.

The present inventors have developed additional processes for reducing the flatulence in legumes and these are described in copending applications entitled "A PROCESS FOR REDUCING FLATULENCE IN LEGUMES" and having Ser. No. 09/236,314, which is being filed concurrently herewith, the contents of which are incorporated by reference.

Utilizing the process described herein, the inventors have developed a means of producing legumes, including beans, that exhibit significantly less flatulence when digested by mammals.

In particular, utilizing the methodology described hereinbelow, the legumes of the present invention have substantially all of the flatulence-causing oligosaccharides, e.g., raffinose, stachyose and verbascose, removed. The concentration of the flatulence-causing oligosaccharides in the legumes produced by the present process is preferably less than about 0.5% and more preferably less than 0.05% of the original dry weight of the legume product produced by the present invention and most preferably about 0% by weight.

The present inventors have developed a process for implementing the aforementioned strategy. More specifically, the present process reduces flatulence in mammals digesting these legumes by removing the flatulence-causing oligosaccharides which are non-digestible by mammals in two steps. In the first step, the legume is soaked at a first temperature as defined hereinabove under conditions sufficient to rehydrate the legume, as described hereinabove.

In the second step, the temperature is raised to a second temperature under conditions sufficient to permit digestion of the flatulence-causing oligosaccharides by the naturally occurring oligosaccharide-reducing enzyme present in the legume and to diffuse the sugar from the legume to the soak water, as described hereinbelow.

In the various process steps described hereinbelow, the legumes are placed in water and are soaked therein. Water sources known to the skilled artisan may be utilized in the present invention. By "water source" it is meant the water used to soak the legumes or any water subsequently added to the soak water. The term "water source" encompasses to any source of water or moisture, including steam. Preferably, the water source is tap water, deionized water, distilled water or combinations thereof. Although the source water may contain mineral salts, it is more preferable that the water not contain too large a mineral content. Thus, the water source also includes soft water.

The inventors have found that the amount of calcium in the initial soak water in the first step has an ultimate effect of the frequency of flatulent episodes exhibited by the mammal. It is preferred therefore that the soak water used in the first step contains some calcium. The preferred level of calcium in the initial soak water in the first step ranges from 0 ppm to about 120 ppm and more preferably from about 30 ppm to about 100 ppm and most preferably from about 50 ppm to about 75 ppm. However, after the first step, in step 2 of the present process, if additional water is added to the soak water or if the soak water is changed, unless indicated to the contrary hereinbelow, soft water (e.g., water containing less than 90 ppm calcium) is preferred over hard-water (e.g., water containing greater than 200 ppm calcium). It is more preferred that the calcium ion concentration in the initial source water and in step two is less than about 70 ppm and more preferably less than about 50 ppm and most preferably having about 0 ppm calcium. If the water from the water source contains too high a level of calcium, the calcium, if desired, can be removed by utilizing ion exchange filtration or passing the water through an ion-exchange column, or treating the hard water with zeolite, utilizing techniques known to the skilled artisan.

The age of the legume utilized in the process described hereinbelow may vary, e.g., from as young as about 1 day or about 1 week after harvesting to as old as two or three years after harvesting. There are differences in behavior between the younger and older legumes. For example, the older legumes will generally take longer to re-hydrate and to remove the flatulence-causing oligosaccharides therefrom, but they generally provide a better yield. Although legumes of various ages may be used in the present process. It is preferred that the legumes utilized in the process described hereinbelow are less than about 13 months old, and more preferred that the legumes are less than about 6 months old and most preferred that the legumes are less than about 4 months old.

In addition, the moisture content of legumes utilized in the present process may vary. In particular, the moisture content of the legume is dependent upon several factors, such as the age and type of legume, the variety within a type, the growing location, harvest conditions and storage conditions, and the like. For example, with beans, it is typical to see dry beans ranging in moisture content from as low as 8% by weight to as high as 25% by weight. All of these legumes with their varying moisture contents are contemplated to be utilized in the present invention.

The water bath used in the present process may be a tank or other container typically used in the industry for soaking legumes. It may contain a drain and/or be connected to the water source by a feed so that the rate of water entering and leaving the water bath can be controlled and/or monitored. The water bath may be heated by techniques known in the art, such as by steam, hot air, heater, heating element or hot plate and the like. It is preferable that the heating be controlled. It is preferred that the heat be applied directly to the container and more preferably to the water directly, rather than the legume. Soaking can be effected by permitting the legumes to soak with or without stirring or agitation. If the water is stirred, the stirring device is one that is typically used in the industry. The water in the soak tank may be sprayed, stagnant or flowing. It is preferred that the water in the bath is flowing. It is even more preferred that the water in the bath is recirculating. It is also preferred that the water bath be adiabatic.

The process of the present invention is explained in greater detail hereinbelow. However, before subjecting the legumes to the present process, as described herein, the legumes may optionally undergo pre-conditioning , which consists of optionally cleaning the legume by conventional methods and an optional pre-soaking. It is to be understood that the optional pre-conditioning consists of either cleaning the legume, or presoaking or combination thereof. Moreover, if the legumes are subjected to cleaning and pre-soaking, the order is not critical, i.e., the cleaning step may precede the pre-soaking step and vice versa.

If the legumes are subjected to the optional cleaning step, they are cleaned by standard techniques known in the art. Stones, metals, twigs, twine, and other foreign matter are usually removed by passing the legumes through a filter. For example, in one embodiment, they are washed, such as by spray washing, to remove the foreign material. Then they are passed over a vibrating screen cleaner, in which the beans pass through a screen, which has perforations or holes large enough for the legumes to pass through but not large enough for the stones and other large objects to pass through. Large objects are retained as the beans fall through the first screen and are caught by a lower screen. Here, in this latter screen, the perforations in the screen are very small, so that the sand and/or dirt adhering to the bean may pass through, but the legume remains on the lower screen. These legumes may then be stored or be used immediately in the steps described hereinbelow.

For purposes of this invention, "a dry clean legume" is a legume from the field in which the foreign material adhered to or associated with the legume is removed before undergoing any of the method steps of the present invention hereinbelow, i.e., prior to undergoing any significant soaking except that which is used in the cleaning step. Unless indicated to the contrary, the term "dry legumes" refers to a legume having the moisture content of a legume naturally found in the field. Finally, a "pre-soaked legume", as used herein, refers to a legume which has been subjected to pre-conditioning, as defined hereinbelow. It is preferred that the legume utilized in the present process is a dry legume. It is more preferred that the legume utilized in the present process has a moisture content ranging from about 8% to about 15% by weight. It is even more preferred that the legume used in the present process is a clean dry legume.

The legume may optionally be preconditioned by contacting it with water from a preconditioning water source at ambient temperatures. Although the legumes begin hydrating in this cleaning step, the amount of hydration is not critical in this step. It varies, depending upon various factors, e.g., the age of the legume, the storage temperature of the legume, humidity, and the like. This optional preconditioning step utilizes a pre-soaking to achieve a substantially uniform moisture content in the legumes. It is preferred, therefore, that the amount of hydration in this step and in the first step of the present process is monitored and controlled. In a preferred embodiment, the legume is contacted with a sufficient amount of a preconditioning water source for a sufficient period of time to produce pre-conditioned legumes having a moisture content in the range from about 15% to about 30% by weight, using techniques known in the art. The dry legume can be contacted with the water source used in the pre-conditioning step by any method known to the skilled artisan. Examples of useful methods include, but are not limited to, spraying, immersion, repeated dipping, misting, floating, diffusion, steam condensing or combination thereof, with immersion being the most preferred. This preconditioning step, if utilized is effected at ambient temperatures.

Of course, the amount of the preconditioning water source used and the period of time necessary for the dry legumes to be in contact with the initial preconditioning water source to produce the preconditioned legumes will vary depending upon the particular method used to contact the dry legumes with the preconditioning water source. Preferably, the ratio of preconditioning water source to dry legumes is at least about 2:1 to about 4:1 and more preferably from about 2.5:1 to about 3.5:1. Also, preferably, the dry legumes are contacted with the preconditioning water source for a period of time in the range of from about 1 to about 30 minutes and more preferably from about 2 to about 20 minutes and more preferably from about 2 to about 10 minutes.

This optional preconditioning step compensates for variations in the legume, including areas of variations, such as legume size, legume variety, growing area, storage time, storage temperature, storage humidity and the like. This step, if utilized, essentially establishes a common starting point for the process steps described hereinbelow.

Prior to the first step of the present process, it is preferred that the water bath be changed in order to remove any dirt, twigs, and the like that may be present therein as a result of the pre-conditioning.

The optionally preconditioned legumes are next subjected to the process of the present invention.

In the first step of the present process, after the optional preconditioning step(s), the legume is optionally soaked and rehydrated in a water bath at the temperature described herein under conditions effective to produce a rehydrated legume having a moisture content which is at least 50% by weight of that of a fully hydrated legume.

As used herein, the term "full hydration" or "fully hydrated" or any synonym in reference to legume refers to the moisture level obtained by the legume after soaking in water for four hours at ambient temperature in water containing 90 ppm calcium carbonate.

As used herein, the moisture content, of a 100% fully rehydrated legume is the amount of water by weight of a dry clean legume that is obtained after the legume is soaked for at least 4 hours at ambient temperature in 90 ppm calcium carbonate water. The moisture content of the legume at 100% rehydration can be easily determined. A sample of clean dry legumes of known weight, such as 400 grams, is placed in a water bath containing 90 ppm $CaCO_3$. The sample is completely immersed in the water and is soaked at ambient temperature for at least 4 hours. When the soaking is completed the legumes are drained, i.e., the water is removed from the surface of the legume, e.g., by draining or any other technique commonly used by the skilled artisan. The moisture content of the legumes in the water bath is determined by art recognized techniques and an average determined to obtain the average moisture content per legume at full hydration. This is the value used to measure the moisture content of a fully hydrated legume. The water utilized in step 1 has the characteristics described hereinabove.

The legumes are preferably substantially immersed in the water bath. Sufficient amount of water is present in the water bath to effect the increase in moisture content of the legumes in the bath. More specifically, the weight ratio of water to legume is sufficient to rehydrate the legumes to attain the moisture levels described herein. Preferably, the weight ratio of water to dry legumes in step 1 ranges from about 1:1 to about 10:1, and more preferably from about 1:1 to about 8:1 and most preferably from about 2:1 to about 4:1.

As indicated hereinabove, the legumes are subjected to a first temperature, the temperature of the water bath being greater than or equal to ambient temperature but less than the critical rehydration temperature. The legumes are soaked in the water bath at the preferred temperatures under conditions effective to rehydrate the legume so that the moisture content of the legume is at least about 50% of that of a fully rehydrated legume.

As used herein the "critical rehydration temperature" is that temperature at which dry legumes soaked in water weigh less than an identical batch of dry legumes soaked in the same water bath at a lower temperature. The critical rehydration temperature is characteristic of each species of legume. For example, the critical rehydration temperature for navy beans, as shown hereinbelow, is about 130° F. However, this value may be the same or different for another type of legume.

The critical rehydration temperature is either known or can be easily determined experimentally. For example, it can be determined by placing a sample of known quantity of dry cleaned legumes (e.g., 400 g) in a known volume (e.g., 2000 ml) of fresh soft water containing 90 ppm calcium and soaking the legumes for 30 minutes at various temperatures ranging from ambient temperature to about 150° F. After soaking for thirty minutes at each temperature, the water is removed from surface of the legume (e.g., by draining or any other techniques commonly used by the skilled artisan), and the partially rehydrated legumes are weighed. The inventors noted that the weight of the 30-minute soaked legumes increases with increasing temperature until the critical rehydration temperature is attained. At the critical rehydration temperature, the weight of the 30-minute soaked legumes is less than the weight of an initially identical batch of dry legumes soaked at a temperature lower than the critical rehydration temperature. Thus, the lowest temperature at which this loss of weight in the legume is observed is the critical rehydration temperature.

The following illustrates the concept. 400 g of dry navy beans were soaked at various temperatures in 90 ppm $CaCO_3$ water for 30 minutes. The weights were measured at the various temperatures.

The values are tabulated hereinbelow:

| SOAK WATER TEMP ° F | WEIGHT OF 400 g DRY NAVY BEAN AFTER 30 MINUTES WASHING |
| --- | --- |
| 125 | 730 |
| 128 | 742 |
| 130 | 718 |

Since the weight of the navy beans at 130° F. is less than the weight at 125° F. and 128° F., it is readily apparent from the data that 130° F. is the critical rehydration temperature of navy beans.

Thus, the legumes are subjected to a temperature ranging from about ambient temperatures to a temperature less than the critical rehydration temperatures. Without wishing to be bound, it is believed that the critical rehydration temperature is the temperature at which new cell wall structure in the legume begins to form.

In a preferred embodiment, it is preferred that the temperature of the water bath ranges from about 90° F. to about 5° F. below the critical rehydration temperature of the legume and more preferably from about 95° F. to about 7° F. below the critical rehydration temperature of the legume. For instance, for legumes, e.g., navy beans, it is preferred therefore that the temperature of the water bath in the first step ranges from about ambient temperature to 130°, and more preferably from ambient temperature to 125° F., and even more preferably from about 90° F. to about 125° and most preferably from about 95° F. to about 123° F.

The soaking in the first step may be effected at one temperature or at more than one temperature, as long as the maximum temperature does not exceed the critical rehydration temperature, e.g., in navy beans, the maximum temperature should not exceed about 130° F. Thus, in this first step, soaking may be effected at two different temperatures, e.g., 95° F. and 123° F. As used herein when using the term "first temperature," it is to be understood that the term encompasses one temperature or a plurality of temperatures within the specified range.

The amount of time required for the rehydration is dependent upon general factors, including, but not limited to the temperature of the water bath, the type of legume, age of the legume, storage condition of the legume and the like. Nevertheless, the soaking is conducted at this first temperature under the conditions described hereinabove until the moisture content of the legumes is at least 50% of that of an identical batch of fully hydrated legumes. It is preferred that the legumes are soaked at the first temperature for about 10 minutes to about 60 minutes and more preferably from about 45 minutes to about 60 minutes.

The soaking is conducted at the first temperature under the conditions described hereinabove until the legumes attain a moisture content of at least about 50% of that of a fully hydrated legume, as defined herein, and more preferably at least about 75% of that of a fully hydrated legume. The moisture content may be up to 100% or higher of a fully hydrated legume as defined herein. Preferably, the moisture content of the legume so treated ranges from about 85% to about 94% of a fully hydrated legume and more preferably from about 87% to about 97%. For example, in some legumes such as navy beans full hydration is typically 48%–55% by weight of the legume. Thus, it is preferred that in the first step the moisture content of the legume is increased to at least 35% and less than about 55% by weight, preferably about 40% by weight to about 50% by weight. In a more preferred embodiment, it is at least 45% by weight of the legume.

The first step also affects the textural quality of the legume; more specifically, the soaked, uncooked legume is noticeably softer, relative to the dry legume. Another effect is that the pH of the unbuffered soak water drops by about one pH unit.

However, it is critical that the temperature(s) of the first soak be within the temperature range described hereinabove. Heating the legumes to a higher temperature will have an adverse effect resulting in a product that does not have the characteristics described hereinabove.

Before being subjected to step two of the present process, the weight of the rehydrated legume is to be within the ranges described hereinabove. However, if after the optional preconditioning, the weight of the legume is within the ranges indicated in the first step, then the first step may be skipped, and the legume may be directly subjected to the conditions of the second step directly.

In step two of the present process, the rehydrated legumes prepared from the first step are heated to a second temperature which is greater than the first temperature but less than the inactivation temperature of the naturally occurring oligosaccharide reducing enzyme. As used in the present specification, the "inactivation temperature of the naturally occurring oligosaccharide reducing enzyme" is that temperature at which the enzyme is substantially inactive after soaking at that temperature for at least 4 hours. The inactivation temperature of the naturally occurring oligosaccharide reducing enzyme is either known to the skilled artisan or can be determined very easily by simple experimentation. For example, a known quantity of legumes, e.g., 400 g, is placed in a known volume of fresh soft soak water (e.g., 1600 ml at 90 ppm $CaCO_3$), at various temperatures between ambient and 160° F. for at least four hours at each temperature. At the end of the prescribed time, the water is removed from the legumes by techniques known to the skilled artisan, for example, draining the legume, and the like and the total oligosaccharides content in the legume is measured, by techniques known to the skilled artisan.

As the skilled artisan would predict, the percent of remaining oligosaccharides in the legume declines as the temperature increases until the inactivation temperature is achieved. However, the percent of oligosaccharides (by weight) in the "drained" legume after at least a 4 hour soak at the inactivation temperature of the naturally occurring oligosaccharide reducing enzyme will be significantly greater than the percent of oligosaccharide (by weight) from the same batch of dry legumes soaked at a temperature just below the inactivation temperature of the naturally occurring oligosaccharide reducing enzyme. Those skilled in the art recognizes that a naturally occurring enzyme system is most active across a narrow range of temperatures just below the inactivation temperature. For the purpose of this specification, the inactivation temperature is a temperature at which the enzyme's activity begins to decline, i.e., the lowest temperature that is greater than the highest temperature in the most active range. In other words, it represents the temperature at which the oligosaccharides remaining in the legume after soaking for at least 4 hours significantly increase relative to the concentration of oligosaccharides present in the legume of the lower temperature. Above the inactivation temperature, the enzymes become increasingly inactivated. The difference in value in percent oligosaccharide remaining in the legume just below the inactivation temperature and at the inactivation temperature is significant. For example, for purposes of illustration the inactivation temperature of the naturally occurring oligosaccharide reducing enzyme in navy beans was investigated using the above techniques. The following results were obtained. For purposes of illustration, the % oligosaccharides in the legume were measured at different times to show the generality of the trend:

| Soak Temp. | % Oligosaccharide remaining in navy beans after soaking | | |
| --- | --- | --- | --- |
| | 4 hours | 7 hours | 24 hours |
| 100 | 1.19 | 1.02 | .36 |
| 110 | 1.04 | .79 | .18 |
| 120 | 0.81 | .42 | .06 |
| 130 | 0.44 | .22 | .10 |
| 140 | 0.30 | .24 | .11 |
| 150 | 0.37 | .31 | .26 |

For navy beans, as shown by the data in the table, the optimum activity range for the endogenous oligosaccharide reducing enzyme is from 120° F. to a temperature less than 150° F. but greater than 140° F. From 120° F. to about 140° F., in all three cases, the % of oligosaccharides remaining in the legumes was at a minimum. However, between 140° F. and 150° F. in all three cases, the oligosaccharides remaining in the navy beans increased dramatically. Thus, the inactivation temperature for this enzyme in navy beans is between about 140° F. and about 150° F.

To further verify that the inactivation temperature of the enzyme was in the range indicated, navy beans were soaked at 150° F. for 24 hours, and the % oligosaccharide in the bean was periodically determined. The results are as indicated hereinbelow.

| TIME (HR) | % OLIGOSACCHARIDE REMAINING 150° F. |
|---|---|
| 0 | 1.63 |
| 1 | 0.89 |
| 4 | 0.37 |
| 7 | .31 |
| 10 | .29 |
| 24 | .26 |

The data clearly show that there is a dramatic decrease in the % of oligosaccharides remaining in the legume during the first four hours. However, after four hours, the oligosaccharide concentration in the legumes decreases much more slowly; this decrease is attributable to diffusion, as described hereinbelow.

Thus, in the second step in the process, the temperature is raised to permit the naturally occurring oligosaccharide-reducing enzyme in the legume to digest the flatulence-causing oligosaccharides. Thus, the soak water is heated to a temperature which is effective for the naturally occurring oligosaccharide reducing enzyme to digest the flatulence-causing oligosaccharides in the legume. It is preferred that the digestion occurs at the enzyme's maximum rate. The inventors have found that a preferred temperature ranges from about 125° F. to about 150° F. and more preferably from about 135° F. to about 150° F., with the most preferred temperature being about 147° F. As with the first step, the effective temperature may be one temperature or more than one temperature, as long as the maximum temperature is less than the inactivation temperature of the naturally occurring oligosaccharide-reducing enzyme. Therefore, as used herein when using the term "second temperature", it is to be understood that the term encompasses one temperature or a plurality of temperatures within the specified range as defined herein, as long as the temperature does not exceed the inactivation temperature of the naturally occurring oligosaccharide reducing enzyme.

However, it is believed that there are other phenomena occurring during this step. For example, without wishing to be bound, it is believed that some of the oligosaccharides in the legume are diffusing into the soak water. As one would expect, the rate of oligosaccharide diffusion from the legume into the soak water is concentration dependent as well as temperature dependent. It is greatest at the beginning of the step, but the rate decelerates as the soaking continues and as the amount of oligosaccharides that remain in the legume approaches the amount in the soak water. It should also be noted that as the concentration of oligosaccharides in the soak water increases, oligosaccharides will be diffusing back into the legume, with the rate of diffusion of oligosaccharides back into the legume increasing as the concentration of oligosaccharides in the soak water increases. In addition, enzymes are concurrently reducing the oligosaccharide concentration in the legume. At equilibrium, the two rates of diffusion are about the same. Equilibrium, however, is achieved substantially quicker than if diffusion were the only means of reducing the concentration of sugars in the legumes as a result of the enzymatic digestion of the sugars in the legume. Nevertheless, at equilibrium, the oligosaccharide concentration in the soak water does not increase. Thus prior to equilibrium, the sugar concentration in the legume is being reduced by two different mechanisms: diffusion and enzymatic reduction.

The amount of oligosaccharides that diffuses out of the legumes into the soaking water can be determined by art recognized techniques. For example, the total amount of the oligosaccharides present in the various legumes is generally known. For example, it is known that the common bean contains 4.90% (w/w) sugar, 1.25% (w/w) sucrose, 0.45% (w/w) raffinose, 1.80% (w/w) stachyose, and 0.25% (w/w) verbascose. The oligosaccharide content of other common legumes are listed in a table on Page 27 in S. S. Abdel Gawad, *Food Chemistry* 1993, 46, 25–31, the contents of which are incorporated by reference. The amount of oligosaccharide leached from the legume, e.g., bean, is determined by measuring the oligosaccharides present in the soak water or in the legume at various time intervals during the successive soak by techniques known in the art, such as by liquid chromatography. Id.

The legumes are maintained at this second temperature for a sufficient amount of time to permit the remainder of the flatulence-causing oligosaccharides present in the legume to be substantially removed. It is preferred that the oligosaccharide concentration in the legume product produced by the present process especially the flatulence-causing oligosaccharides, is less than about 0.5% by dry weight of the legume, and more preferably less than 0.05% by dry weight of the legume and most preferably about 0% by weight. Moreover, it is preferred that the concentration of the verbascose and raffinose is about 0% by weight of the legume and that the concentration of stachyose is less than about 0.5% by dry weight of the legume and more preferably less than 0.05% by dry weight of the legume. The effective conditions are those described herein so as to permit the naturally occurring enzyme in the legume to digest a substantial amount of the remaining flatulence-causing oligosaccharides present in the legume, while simultaneously permitting additional flatulence-causing oligosaccharides to diffuse into the soak water.

The present inventors have found that the enzymatic digestion of the oligosaccharides is most effective when the pH of the soak water is about or near neutral or slightly basic. More specifically, it is preferred that the pH of the water bath ranges from about 5.5 to about 9.0 and more preferably from about 6.0 to about 9.0 and most preferably from about 6.5 to about 7.5. In order to maintain the pH within these ranges, a buffer known to the skilled artisan may optionally be added to the soak water in amounts effective to maintain the pH in the range indicated under the conditions of the second step of the present process. If a buffer is utilized, it is preferred that it is prepared using soft water and more preferably water which is substantially calcium free. However, a buffer is usually not present, since during the process of the present invention, the pH is normally in the ranges specified hereinabove.

The inventors have found that the time and temperature of the first step materially affects the ability to remove oligosaccharides in the second step and the activity of this naturally occurring enzyme. If rehydration is allowed to proceed substantially to completion in the first step, the activity of this enzyme unexpectedly reaches a kinetic plateau at temperatures less than its inactivation temperature. Without wishing to be bound, it is believed that if the soaking in the first step is effected in accordance herewith, the legume is sufficiently swelled, so then when heated to the second temperature in the second step, freer moisture migration is permitted within the legume. If, on the other hand, the legume is rehydrated at a higher temperature than the critical rehydration temperature, such at temperatures wherein internal structure is formed, for example, by calcium pectate formation or by partial protein coagulation, then the subsequent rate of oligosaccharide removal is slowed.

The soaking in the second step is effected by permitting the legumes to soak with or without stirring. If the legumes are mixed or stirred, agitation or mixing is effected by using a stirring device known in the art. Water may be either stagnant or flowing. Although the water utilized may be the soaking water used in the first step, fresh water may be added or the soak water from the first step may be partially or fully replaced with fresh water. If fresh water is utilized, it may contain mineral salts. However, it is preferred that the fresh water used is tap water, deionized water, soft water or distilled water or combination thereof. If tap water is utilized, it is preferred that soft water be utilized. It is preferred that the amount of calcium present in the fresh water is minimal; in fact, the attributes of any fresh water utilized in this second step described hereinabove are those described hereinabove for the water source for the second and third steps of the present process.

Again, it is preferred that the legumes be substantially immersed in the water. The water to legume weight ratio may be the same or different than that utilized in the first step.

Thus relative to the re-hydrated legumes formed in the first step, it is preferable that the weight ratio of water to legumes ranges from about 2:3 to about 5:1; and more preferably from about 2:1 to about 4:1. In a most preferred embodiment, the ratio is about 4:1.

At the end of the second step, substantially all of the oligosaccharide concentration, especially the flatulence-causing oligosaccharide in the legume seed has been removed. By "substantially", it is meant that at least 90% of the oligosaccharide (especially the flatulence-causing oligosaccharide) content has been removed from the legume seed, and more preferably greater than 95% and most preferably greater than 99% of the oligosaccharide, (especially the flatulence-causing oligosaccharide) content has been removed from the legume seed. It is preferred that after the second step of the present process, the oligosaccharide, (especially the flatulence-causing oligosaccharide) content in the legume is about 0%.

It is preferred that the soaking legumes, e.g., navy beans will achieve the above-identified oligosaccharide level after heating the soaking legume at the second temperature within about 5 hours, and more preferably within about 4 hours. It is also preferred that the soaking legumes, e.g., navy beans be heated at the second temperature for at least about 1 hour and more preferably for at least about 2 hours. It is preferred that the soaking legumes, e.g., navy beans be heated at the second temperature for about 1.5 to about 5 hours, more preferably from about 2 to about 4 hours and most preferably for about 3.5 hours. For some of the large legumes, however, the preferred soaking times for the second step may be increased.

It is to be noted that the legumes may be soaked in the water for times longer than that indicated hereinabove, especially if the soaking occurs at lower temperatures, for heating increases the rate of oligosaccharide removal. If the legumes are soaked for more than the above-specified time, the present process would become less efficient. However, the present inventors have found that as the amount of soak water increases, the greater is its holding capacity for the leached components, i.e., the flatulence-causing oligosaccharides as well as other solubles, e.g., calcium. In addition, the greater the amount of soaking water present, the greater is the initial amount of sugar leached from the legume. The present inventors have found that if too much water is added, however, the process starts to become less efficient, and there is relatively little additional benefit to use water in those amounts. Thus the effective conditions are such so as to permit the naturally occurring oligosaccharide reducing enzyme to digest flatulence-causing oligosaccharides present in the legume, while simultaneously permitting the oligosaccharide concentration in the soak water to increase by diffusion of the sugar into the soak water from the legume.

During the second step of the process, it is preferred that the water bath be changed with fresh water at least once, as described hereinbelow; it is more preferred that the soak water in the second step be changed twice or thrice, as described hereinbelow.

The next step, step 3 in the process, is optional; the legume may optionally be blanched under effective blanching conditions. The present inventors have found that the blanching temperature is below the boiling point of water. Preferably, if conducted, the blanching is performed at temperatures ranging between about 165° F. to about 210° F. and more preferably from about 165° F. to about 190° F., and most preferably from about 170° F. to about 185° F. Blanching may be effected at one temperature or more than one temperature within the effective range. Thus, it is to be understood that the third temperature or the blanching temperature or any synonym or other reference thereto encompasses one temperature or a plurality of temperatures defined herein. These temperatures are maintained for a time sufficient to ensure that the entire legume is maintained at that temperature. The legumes are preferably blanched for a period of time in the range from about 1 to about 20 minutes, and more preferably from about 2 to about 10 minutes and most preferably from about 3 to about 7 minutes. The legumes after step 4 are firmer than prior to step 3.

Blanching is performed for a time sufficient to remove substances or inactivate enzymes that might otherwise cause undesirable changes in texture, odor, flavor, color or nutritive value during processing or might otherwise cause unwarranted oxidative changes in the food. In addition, blanching effects removal of intercellular gases within vegetable tissues, thereby reducing the potential for subsequent oxidative changes and permits attainment of adequate headspace vacuum in cans. Blanching is also performed under conditions effective to remove toxic constituents, such as nitrates and contaminating microorganisms. Moreover, blanching accomplishes at least one more effect; it prevents an excessive amount of starch to leach from the legumes into the sauce during the preservation steps, described hereinbelow. Without wishing to be bound, it is believed that the blanching promotes the coagulation of the protein which surrounds the starch in the legumes, thereby forming a barrier therearound and preventing an excessive amount of starch from leaching from the legumes during the preservation steps.

During the present process described hereinabove, the present inventors have found that the water may be changed during and after any step of the present process. It is preferred that the soak water is changed at least once, especially if the oligosaccharides in the soak water begin to diffuse back into the legume. Although it is optional to change the soak water after the first step of the present process, it is preferred that the soak water be changed at least once and more preferably at least two times and most preferably at least three times during the second step, especially when the concentration of the sugar in the soak water begins to decrease. As indicated hereinabove, during the second step, there are at least two phenomena occurring. First, the flatulence-causing oligosaccharides are diffusing out of the bean. As long as there is a larger concentration of the oligosaccharides in the legume than in the soak water, the oligosaccharide concentration in the soak water will increase from the diffusion thereof from the legume to the soak water. This differential in concentrations between the legume and the soak water is the driving force for the diffusion. More specifically, the driving force for diffusion is to transfer soluble solids from high concentration zones to lower concentration zones. For purposes of discussion herein, if oligosaccharides are diffusing from the legume to the soak water, so that the net concentration of oligosaccharides in the soaking water increases, it is called a positive diffusion. Moreover, for purposes of discussion, this differential in oligosaccharide concentration in the legume relative to the soak water permitting the positive diffusion to occur is termed "a positive oligosaccharide concentration reduction driving force." As more and more oligosaccharides diffuse from the legume, the concentration of the oligosaccharides in the soak water begins to approach the concentration of the oligosaccharide in the legume and the rate of diffusion slows down.

However, there is a second phenomenon also occurring. The naturally occurring oligosaccharide-reducing enzyme in the legume is digesting the oligosaccharides, forming simple sugars therefrom, thus reducing the concentration of oligosaccharides in the legume. Thus, the remaining flatulence-causing oligosaccharide in the legume will decline as the leaching action and enzymatic activity progress. At some time, the sugar content in the soak water will be approximately equal to the sugar content in the legume. At that point, as the skilled artisan will realize, the sugar concentration in the legume will, as a result of the continuing enzymatic activity be less than the sugar concentration in the soak water. Once the concentration of these sugars in the legume drops below the sugar concentration in the soak water, the sugar in the soaking water will diffuse back into the legume because the driving force has reversed. The diffusion from the soak water back to the legume, causing a net decrease in the sugar concentration in the soak water, is called a negative diffusion.

Although the soak water can be changed any number of times to make the present process more efficient, it is preferred that the soak water be changed only when necessary, i.e., at the time when the concentration of the sugar in the soak water begins to decline. This makes the process of the present invention more efficient and permits additional oligosaccharides to continue to leach from the legume into the soak water, thereby maximizing the amount of flatulence-causing oligosaccharides originally in the legume to leach into the water bath. For example, if the same soak water were utilized during the entire process of steps 1–3, once an equilibrium between the oligosaccharides in the legume and in the soak water is attained, no more oligosaccharides can be leached from the legume into the soak water, thereby limiting the amount of sugar being leached from the legume. By changing the soak water, especially when equilibrium with respect to the sugars in the soak water and the legume is attained, additional amounts of oligosaccharides can be leached from the legume into the water bath. Under the conditions of the present process, however, it is preferred that the soak water not be changed until some time during the second step of the process.

This point whereby the sugar concentration in the soak water begins to decrease can be determined by measuring the brix. Brix is a well known refractive index measure of the soluble solids, e.g., sugars in a liquid. As the sugars are diffusing out of the legume into the soak water, the concentration of the sugar increases and the brix increases. However, when the concentration of the sugar in the soak water is higher than that in the legume, the sugar in the soak water begins to diffuse back into the legume, and the brix of the soak water begins to decrease. Thus, when the brix of the soak water is first noticed to decline, then it is necessary to change the soak water.

The new soak water will have initially a zero concentration of sugar and thus, there is a positive driving force again for the sugars to be leached from the legume into the soaking water.

Thus, during the entire process, and especially during the second step, it is preferred that there is a continuous and periodic monitoring of the brix in the soak water to determine when the brix of the soak water begins to decline so that the soak water can be changed. It is preferred that the brix be measured at least once every 60 minutes, and more preferably within every 30 minutes.

The present inventors have found that changing the water bath after step 2 has little effect on the digestibility of the legume. However, if the water bath is optionally changed, or if fresh water is added to the water bath it is preferred that hard water be used because the calcium content of the hard water gives the legume added firmness and fixes the weight gain in step 3. In steps 1 and 2, the legume is intentionally over-tenderized to achieve maximum starch swelling. Then, if water is optionally changed or if fresh water is added to the water bath after step 2, hard water is utilized to intentionally firm the legume in step 3 to achieve the desired firmness. Alternatively, calcium can be added to the sauce or other vehicle prior to or simultaneous with forming a legume-based mixture in a later step to achieve the desired firmness, as described hereinbelow. Those skilled in the art will realize that the degree of hardness can be adjusted to achieve the desired tenderness.

After being subjected to steps 1 and 2 and optionally step 3 of the present process, the legumes are ready to be preserved. The usual type of preserving includes canning, freezing, drying, and the like. Initially the legumes so prepared are combined with a vehicle, as defined hereinbelow and mixed with optional ingredients, depending on the purpose, using standard techniques in the art. The legumes also may be used whole or crushed or mashed using techniques known in the art. Nevertheless, regardless of the preservation technique, the legumes are typically combined with a vehicle to produce a legume-containing mixture. The mixture may additionally contain foods typically included in these mixtures, e.g., meat, vegetables and the like. Of course, the amount of legumes in the legume-containing mixture will depend upon the particular product being produced. Examples of legume-containing products that can be prepared by the process of the present invention include, but are not limited to, pork and beans, vegetarian beans, hot dog and beans, sausage and beans, chili with beans, baked beans, pre-cooked ingredient beans, bean salad, southern peas, bean soups, beans with meat, bean spreads, beans with cheese, beans with rice, flavored beans, beans with pasta, bean dips, bean casseroles, bean salsa, bean snacks, bean pastes, bean side dishes, bean flour, re-fried beans, bean powder, pet foods and the like; however pork and beans, chili with beans, and baked beans are preferred. The legume containing mixture preferably comprises from about 5% by weight to about 95% by weight and more preferably from about 15% by weight to about 75% by weight and most preferably from about 35% by weight to about 65% by weight of the legume produced in accordance with the present invention, with the balance being a vehicle.

When the legume-containing mixture is the preferred pork and beans, the mixture preferably comprises from about 25% by weight to about 85% by weight, more preferably from about 30% by weight to about 75% by weight, and most preferably from about 35% by weight to about 65% by weight of beans, prepared in accordance with the process described hereinabove, and the balance being the vehicle; when the legume-containing mixture is the preferred baked beans, the mixture preferably comprises from about 25% by weight to about 65% by weight, more preferably from about 40% by weight to about 60% by weight, and most preferably from about 35% by weight to about 50% by weight of beans, prepared in accordance with the process described hereinabove and the balance being the vehicle; when the legume-containing mixture is the preferred chili with beans, the mixture preferably comprises from about 10% by weight to about 40% by weight, more preferably from about 15% by weight to about 35% by weight, and most preferably from about 20% by weight to about 30% by weight of beans, prepared in accordance with the process described hereinabove, with the balance being the vehicle. These legume-containing mixtures may further comprise other ingredients which are typically included in such mixtures. These type of ingredients and their relative concentrations will be known to one skilled in the art.

The term "vehicle," as used herein, refers to an edible medium that the legumes prepared in accordance with the present invention may be combined with. The vehicle can be any edible medium known to those skilled in the art. Furthermore, the vehicle may be a single component or ingredient, such as water, or may be a mixture of components or ingredients. Preferably, the vehicle is compatible with the particular legume prepared in accordance with the present invention being used. Examples of vehicles useful in the present invention include, but are not limited to, water, brine, a tomato-based sauce, a molasses-based sauce, a brown sugar-based sauce, chili sauce, barbecue sauce, smoke-flavored sauce, and baked bean sauce. The phrase "tomato-based sauce", as used herein, refers to the sauce used to prepare products such as pork and beans, hot dogs and beans, and vegetarian beans. The composition of such tomato-based sauce will be appreciated by one skilled in the art. The phrase "chili sauce", as used herein, refers to the sauce used to prepare chili-type products when combined with beans. The composition of such chili sauce will also be appreciated by one skilled in the art. The phrase "baked bean sauce", as used herein, refers to the sauce used to prepare baked bean products when combined with beans. The composition of such baked bean sauce will also be appreciated by one skilled in the art.

The legume-containing mixture may additionally contain optional ingredients such as pork, beef, chicken, tofu or other soy derivatives, turkey, fish, spices, flavoring agents, tomato derivatives, dairy derivatives, grains, gums, starches, sugars, coloring agents, oils, salts, fruits, vitamins, vegetables, cereals, calcium sources, such as calcium chloride, phosphates, and mixtures thereof and the like. The concentration of each and all of these optional ingredients will depend upon the desired flavor profile and appearance of the final product, and will be appreciated by one skilled in the art.

The legume-containing mixture is prepared by combining the legumes, prepared in accordance with the process described hereinabove with the vehicle, along with any desired optional ingredients. The ingredients may be added singularly or combined in any manner known to those skilled in the art. It is preferred to separately add each ingredient into a vessel or container and mix them together. Thus, for example, the legumes prepared in accordance with the present invention, then other fresh ingredients, such as chopped onions or pieces of pork, and then the vehicle are sequentially added into a container. Another method is to add the various ingredients, separately or in combination, into an agitated tank, wherein they are stirred or agitated until the ingredients are uniformly dispersed through the legume-containing mixture. If necessary, to increase the firmness of the vegetable, sufficient calcium may be added to the legume containing mixture until the desired firmness is obtained.

After the legume-containing mixture is prepared, it is then preserved by the desired route using conventional techniques known in the art. For example, various methods known in the art are used to preserve the legume containing mixture, such as retorting, refrigeration, irradiation, freezing, aseptic processing, microwave processing, dehydration, freezing-drying, acidification, pickling, and the like. For example, in freezing, the freezing may be accomplished by known techniques in the art, e.g., individually quick frozen techniques, freezing the legume in a container, e.g., blast freezing or immersion of the legumes into a freezing solution. In dehydration, water is removed from the legumes by applying heat thereto, using techniques known in the art, such as forced air drying, drum drying, spray drying, vacuum drying, freeze drying and the like. Heating may also be effected by solar heating techniques known in the art. It is preferred that the legumes are dried in dehydrators. If dehydration is utilized, it is preferred that before dehydration, preservatives, such as sulfite (e.g., sodium sulfite or metabisulfite) be applied to any cut legume.

However, the most preferred preservation route is retorting. In this method, the legume-containing mixtures described hereinabove are charged into a container. Examples of typical containers include, but are not limited to, tin plate or steel cans with or without enamel linings or coating, aluminum cans, flexible or semi-rigid containers, glass bottles and jars, plastic bowls with or without lids, coated cartons, aluminum trays, flexible pouches, retortable containers and the like. The phrase "retortable container", as used herein, refers to a container which is capable of withstanding the temperature and conditions of a retort operation. The preferred container is the retortable container. The retortable container may be any type suitable for retort processing.

In the retorting method, the legumes are thermally processed in a retortable container. More specifically, in the preferred embodiment, after the legume-containing mixture is prepared, it is charged into a retortable container, then sealed. After the retortable container is sealed, it is thermally processed. This is accomplished by heating the retortable container and the legume-containing mixture contained therein at a sufficient temperature and for a sufficient period of time to thermally process the legume. The time and temperature requirements are dependent upon the legume-containing mixture being thermally processed and the size, shape and composition of the retortable container, and the type of retort equipment used, which is easily determined by one skilled in the art.

The retort operation can be carried out in any retort equipment known to those skilled in the art. Examples of useful retort equipment include, but are not limited to, hydrostatic retorts, crateless retorts, rotary retorts, agitating retorts, and still retorts. As will be appreciated by one skilled in the art, and as already pointed out herein, the time and temperature parameters necessary to prepare the legume product will depend upon the type of retort equipment used.

Optionally, prior to retorting, the open retortable containers are filled with legumes prepared in accordance with the present invention in combination with the vehicle, and are placed on a conveyor of any suitable style and passed through an oven, as described in U.S. Pat. No. 1,718,187 to Bartlett, the contents of which are incorporated by reference. The temperature of the oven is preferably between 400° F. and 500° F. and more preferably at or about 450° F., and the legumes are subjected to the high heat of the oven for a time sufficient to sufficiently bake the legume in the open containers. Upon removal of the containers from the oven, a quantity of the vehicle is added to each container sufficient to compensate for vehicle lost by evaporation and absorption during the baking steps and sufficient to meet fill standards. The containers are next hermetically sealed and then thermally processed under retorting conditions known to the skilled artisan, as described hereinabove. Other methods for preserving the legumes prepared by the present invention are described in U.S. Pat. Nos. 2,232,282 to Struble, 1,495,736 to Hadley, 1,548,796 to Libby, 2,278,475 to Musher, and 2,360,062 to Lannen, the contents of which are all incorporated by reference.

After preserving, the retortable containers are labeled and ready for distribution to the consumer.

As indicated hereinabove, the legumes may be prepared into a paste or puree. This is effected using techniques well known in the art. See U.S. Pat. No. 4,871,567, the contents of which are incorporated by reference. For example, the legumes are crushed or mashed using techniques known in the art.

In addition, the crushed legumes may be mixed with whole legumes, such as in preparing refried beans. In preparing refried beans, the beans subjected to steps 1–2 and optionally step 3 described hereinabove are separated into two separate streams. One stream consists of the whole beans; while the other stream consists of the beans which are to be crushed or mashed. The first stream of beans, (i.e., the beans which are to remain whole) may optionally be baked under normal baking condition.

The second subquantity of beans (beans to be crushed) are subjected to crushing using standard techniques in the art. After crushing, the second subquantity of beans is mixed with the first quantity of beans and then dried using techniques known in the art such as that described in U.S. Pat. No. 4,871,567, the contents of which are incorporated by reference.

The legumes prepared by this invention can be used in foods fed to various kinds of mammals, including dogs, cats and other domestic and farm animals. However, preferably they are prepared for ingestion by man.

The legumes prepared in accordance with the procedures described hereinabove exhibit the characteristics described hereinabove, with legumes exhibiting very low flatulence.

The inventors have noted that when the soak water in steps 1 and 2 described hereinabove is changed abruptly, i.e., when the old soak water is removed completely and then replaced with fresh water, the legumes develop increased and noticeable, severe cracking (splitting) in the skin. (Normally, per 100 legumes, e.g., beans, there may be about 15% by count with severe cracking.) However, under these circumstance, when the soak water is changed abruptly, the amount of cracking increases substantially e.g., 50% cracking which is readily visually observable. However, when the soak water is changed gradually, excessive cracking in the legume does not occur or is diminished. Thus, in a preferred embodiment, the legumes are soaked in a soak tank which has an outlet drain for water and an inlet for water to be added wherein the rate of entry and outlet of the soak water is controlled. Without wishing to be bound it is believed that this is due to the following phenomena: When the legumes are soaking in the present process, the legume is swelled with water. At the same time, there is considerable amount of sugar in the soak water as well as other components in the soak water. If the fresh water replaces the old sugar - containing water abruptly, e.g., by dumping out the soak water and then replenishing the water, there is a considerable change in the soak water brix, e.g., from a positive amount to zero. This represents a considerable change in osmotic pressure. This abrupt change in pressure pushes excess water into the legume, swelling it even further. If the swelling rate is excessive, the legume skin stretches beyond its yield point and creates a weakness in the skin. However, the swelling is temporary as the interior sugar migrates out of the legume and into the soak water, resulting in excess water being expelled by the legume.

However, at high osmotic pressure differences, the swelling/deswelling response is so great that permanent damage is done to the integrity of the legume surface. Although the damage is not obvious to the naked eye during soaking, after being subjected to preserving conditions, such as retorting, which completes gelation swelling, the damage is visually apparent as increased equatorial fractioning of the legume. If the legumes, such as beans are ultimately served as a puree or paste, the presence of cracking in the legumes is unimportant, since in puree, the legume is mashed in any event, as described hereinabove.

On the other hand, if the legume is not to be mashed, then "cracking" detracts from the texture and appearance of the legume. To avoid excessive cracking in the legume, the new soak water is added to the soak tank or container at a rate effective to minimize cracking after the legume is subjected to cooking. Preferably, the new soak water is added to the soak tank at a rate ranging from about 1%/min to about 4%/min. In this case, percent per minute means the fresh gallons added per minute divided by the total free gallons of water in the soak and balance tank system. Another way of measuring the rate is to analyze the change in soak water brix. The inventors have found that the cracking is minimized when the change in soak water brix is less than about −2.0 and more preferably less than about −1.0 per hour. When the rate of bleed-in of the new soak water is within the ranges described hereinabove, the present inventors have noted that the legumes obtained have less cracking than that obtained previously heretofore.

As indicated hereinabove, the operations of steps 1–3 may be conducted in a soak that is conventionally used in the art. The soak tank may have a water inlet and drain. In addition, the soak tank may be stirred by conventional means or the water may be circulating. The soak tank may be a vertical soak tank typically used in the art.

In an even more preferred embodiment the operations in steps 1–3 are conducted in a horizontal flow soak tank apparatus, as described in copending application entitled "SOAK APPARATUS FOR LEACHING SOLUBLE CONSTITUENTS FROM INSOLUBLE MATERIALS, filed concomitantly herewith and having Ser. No. 09/489,748 the contents of which are incorporated by reference.

The horizontal soak tank apparatus is described therein. It comprises a series of screen which provides a substantially uniform flow of water through the horizontal soak tank. Moreover, as described therein, the horizontal tank is connected to a balance tank containing soak water to which temperature controls are imparted, in correlation with desired processing requirements. A suitable pumping arrangement facilitates temperature-regulated water to be pumped in laminar flow through the charge of legumes in the soak tank, and in continuous flow returned through a pumping system to the balance tank over a specified time period. This soak cycle is repeated under varied conditions, both as to temperature and time in circulating the flow through the soak tank, until the intended amounts of solubles have been extracted from the legumes, rendering the latter potentially more digestible to a consumer, while retaining the desired texture and taste of the legumes.

Figure 2:
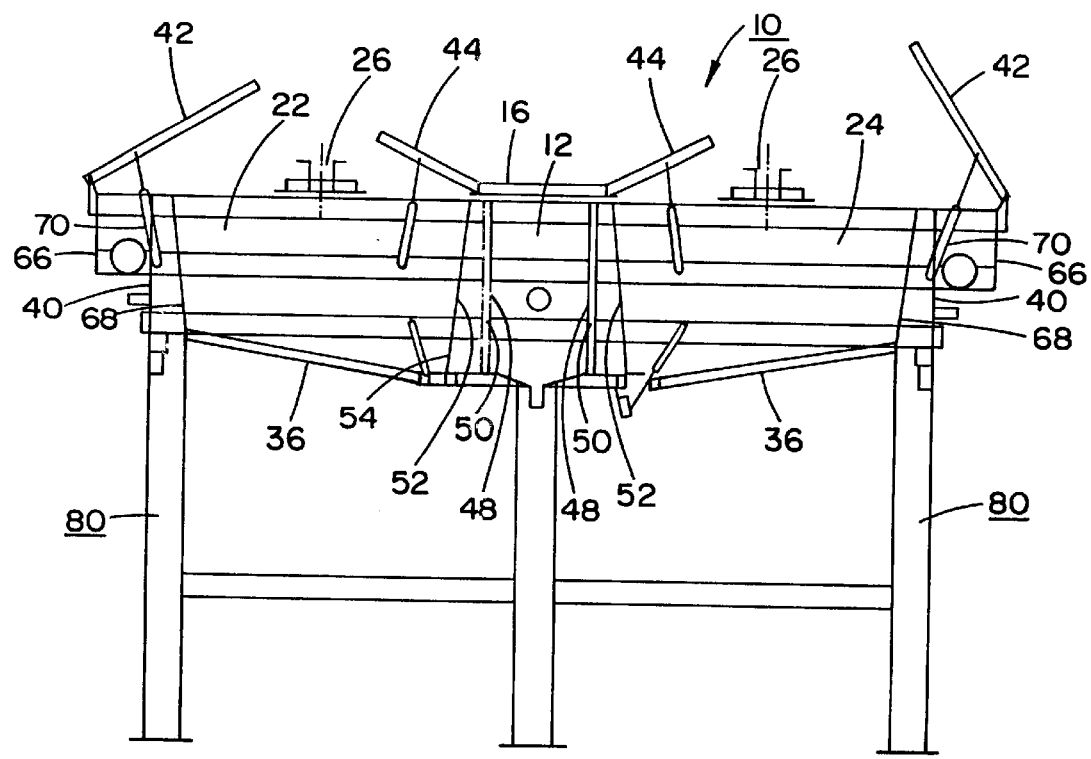
FIG. 2 illustrates a partially sectional front view of the soak tank of FIG. 1.

The apparatus is depicted schematically in FIGS. 1 and 2 and is described in more detail in the copending application referred to hereinabove. As illustrated therein, the apparatus contains a horizontal flow soak tank 10 which includes a header 12 of box-shaped configurations which possesses an inlet 14 for a soaking liquid, such as temperature-controlled water, and has a closable cover 16 for maintaining a superatmospheric pressure in the header. Communicating with the opposite sides 18 and 20 of the header 12 and extending horizontally therefrom in mirror-image arrangement are a pair of hoppers 22, 24, each adapted to receive through inlets 26, a charge of legumes which are to be soaked in a continuous water flow and heated. The header 12 and hoppers 22, 24 communicate by means of a system of screens, wherein the soak tank 10 is in a continuous recirculating water flow connection with a balance tank 28 which provides a continuous flow of processing water under predetermined temperature and timing cycle conditions for effecting the treatment of the beans.

Each hopper 22, 24 has vertically extending sidewalls 32, 34, and a bottom wall 36 which slopes at an upward incline away from the juncture thereof with the lower end of the header 12. Extending along the bottom wall 36 of each hopper proximate the header lower end is a closeable elongate outlet gate 38 for discharge of processed legumes at the termination of the soak cycle. The transverse end of each hopper distant from the header 12 communicates with an overflow through 40 for reconveying the flow of water from the hoppers to the balance tank 28. The hoppers 22, 24 are each adapted to be sealingly closed by covers 42 and 44.

Water is continuously introduced from the balance tank 28 into the header 12 under a superatmospheric pressure and a controlled temperature, and then passed through a system of screens communicating the header 12 with the hoppers 22, 24 so as to flow through the pile of legumes contained in each of the hoppers of the horizontal flow soak tank. The water, after passing through the piles of legume in a generally horizontal laminar flow path is passed through a further screen into an overflow trough and then recirculated into to the balance tank 28 by means of a pumping circuit, temperature-regulated in the balance tank and again returned to the header for recirculation through the hoppers, thereby providing a continuous flow circuit.

The system of screens employed in the horizontal flow soak tank 10 provides a first set of screens between the header 12 and each respective hopper 22 and 24. This screen 48, together with a further closely spaced parallel screen 50 each possessing a small mesh will convert turbulent flow of the water within the header 12 into a non-laminar but not quite turbulent flow. The flow passing through the parallel screens 48, 50 create a plug-type water flow extending horizontally across the width of the tank containing the pile of legumes towards the overflow trough.

The screen 52 which functions as an end wall for each respective hopper 22, 24, is inclined relative to the vertical, so that the bottom end 54 thereof is extended forwardly to be closely adjacent to the edge of the respective elongate gate 38 for discharging processed beans at the termination of the extraction of solubles. This inclined orientation of the screen 52, in conjunction with the upwardly sloping bottom wall 36 of each hopper will impart a slightly upward circulation to the pile of legumes, and provides a relief for product expansion during rehydration, ensuring a uniform treatment thereof. In addition, the use and location of screen 52 separates the pile of legumes from the negative direct impingement of the soak water media exiting mesh screen 48, 50.

At the discharge end 66 of each hopper 22 or 24 there is located a screen 68 which is similar to screen 52, but which is inclined at a reverse angle relative thereto. A solid baffle 70 arranged exteriorly of screen 68 imparts an underoverflow to the water exiting from the soak tank as it is recirculated to the balance tank 28. The screen 68 also acts as an inclined plane to provide a relief angle for the bean pile as swelling takes place.

In essence, the entire horizontal flow soak tank 10 may be supported on suitable support structure 80.

Located at regions within the hoppers 22, 24 containing the beans which are to be processed are a plurality of temperature sensors 84 which will constantly monitor the temperature of the process water.

The operation of the soak tank system is essentially as follows:

The empty clean hoppers 22, 24 are initially filled with clean water at ambient temperature.

The legumes are then added to the tank, wherein the amount of legumes added will vary, based on the swelling characteristics of a particular genus.

In the balance tank 28, the water is heated to the first temperature and recirculated through the legume pile in horizontal plug flow as described hereinabove in the first step of the process to rehydration of the legume.

Thereafter, the water is heated to a second temperature and recirculated through the system in horizontal plug flow to permit diffusion of the sugar and other solubles from the legumes into the soak water and to permit the natural oligosaccharide reducing enzyme to hydrolyze the flatulence causing sugars. If the legumes are subjected to blanching, the water is then heated to blanching temperatures.

As described hereinabove, when the old soak water has accumulated high levels of sugar and other soluble ingredients which have leached out of the legumes, such high levels in the soak water inhibit subsequent leaching of other soluble components from the beans. Accordingly, in order to ameliorate the foregoing, fresh soft water is bled into the recirculating water. A different number of bleed-in levels would be acceptable, wherein a preferred rate of bleed-in of fresh water is about 1% to about 4%; in essence, fresh water is added at a volume of about 2.6% to the recirculating flow rate. In a preferred embodiment, when water is circulated at 300 gallons per minute, 10 gallons per minute of old waters is drained off, upon which there is automatically added 10 gallons per minute of fresh, soft water in order to maintain the water level.

In a further preferred embodiment, there is provided an additional relatively large-apertured screen upstream of the small-hole screens or perforated plates. This upstream screen merely removes large particles, such as debris, twigs, legume skin, and the like which can enter the recirculating system.

The water flow through the final slotted or ribbed wire screen 52 is substantially equal in its distribution and very slow across the entire screen surface preferably about 1 cm per second.

The balance tank 28 is level-controlled, using well known control technology and discharges into a recirculating pump wherein a series of valves permit bleed-out of old water, while a level controller bleeds in fresh water. A second valve permits old water to be discharged while the level controller concurrently adds fresh water.

If the legumes are blanched, the temperature of the recirculating water is raised to blanching temperatures and the legumes are soaked in the recirculating water under blanching conditions, as described hereinabove.

Unless indicated to the contrary, the percentages used herein are by weight.

The following examples further illustrate, but do not limit, the present invention.

Furthermore, it is to be understood that, the free moisture of the soak tank plus balance tank is defined as the total water in the balance tank and associated communication means and the volume in the soak tank less the volume of the legumes in the soak tank. The volume of legumes are measured experimentally.

For example, with navy beans, a small container is filled with soaked beans and weighed. The container is then filled to the brim with water and weighed a second time. The container is emptied and filled with water and weighed, for example, a 16 oz can for navy beans holds 448 ml of water. A can of navy beans typically weighs 298 g. The beans and water used therefore weighs 482 g. The free water in the can is 482−298 is 184 g. The free water percent in the can is (184×100)/448=41%.

The free water in the apparatus used in some of the examples described hereinbelow is calculated the same way.

For example, if the balance tank volume is 149 gallons and the soak tank volume is 206 gallons. Together the volume is 355 gallons. A typical free moisture is therefore 0.41 (206+149)=233 gallons.

Variation in bean swelling causes variations in the free moisture calculation.

In the following examples, % oligosaccharide in the legume was determined using the following techniques.

% Oligosaccharides

This was determined in accordance with Procedure AOAC 977.20, incorporated herein by reference, utilizing a standard liquid chromatograph having a column 300×4 (id) mm μ Bondapak Carbohydrate. The flow rate was 1.0 ml/min and the temperature setting is at ambient temperature.

The reagents used for the mobile phase is acetonitrile diluted with water ranging from 60 parts acetonitrile/40 parts water (v/v) to 90 parts acetonitrile/10 parts water (v/v), with 70:30 acetonitrile/water being the optimum (v/v).

The standards used were fructose, glucose, raffinose, stachyose, and verbascose. One gram of each of the sugars, was dissolved separately in 100 mL of water, then 4 parts of the aqueous solution was diluted with 6 parts (v/v) of acetonitrile. 20 μL of each of these solutions were injected into the liquid chromatograph to obtain retention times. The retention times are determined.

In preparing the bean sample if it were a paste, 15 g is weighed into shaker cup, 100 mL of water are added thereto, and sample is shaken for at least 30 minutes to assure dissolution of sugar: Liquid samples from the beans are used as is. 4 parts of aqueous solution is diluted with 6 parts (v/v) of acetonitrile, allowed to sit for at least two minutes to assure precipitation of insolubles, then filtered and injected into the liquid chromatograph.

Then 20 μL of standards are injected. The retention times of each of the sugars standards is established. Then 20 μL of sample is injected and the % of oligosaccharide present is determined by integrator values or from peak heights as follows:

weight % sugar=$100 \times PH/PH^1 \times (V/V^1) \times (W^1/W)$ where PH and $PH^1$=peak heights (or integrator values) of sample and standard, respectively; v and $v^1$=mL sample and standard solutions; and w and $w^1$=g sample and standard, respectively.

EXAMPLE 1

200 grams of dry (9.32% moisture) navy beans were soaked in 800 mL of soft water containing 0 ppm calcium for two hours at 90° F., then the soak water was discarded, and fresh soft water of equal amount added. Then the navy beans were soaked for three hours at 135° F., then the navy beans were blanched in fresh water of equal amount for 5 minutes at 185° F. The navy beans are placed in cans, baked bean sauce is added, and the mixture in container is baked, sealed, thermally processed and cooled in accordance with the procedure described hereinabove.

EXAMPLE 2

The procedure of Example 1 is followed except the soak water was changed between each soak protocol. The initial unbuffered soft water had a pH of 8.69. The calcium extracted in the 90° F. soak was 778 ppm of dry weight navy bean. The pH at the end of the 90° F. soak was 6.71. The calcium extracted from the 135° F. soak was 1,234 ppm of dry weight navy bean. The pH at the end of the 135° F. soak was 6.29. The remainder of Example 1 was followed.

EXAMPLE 3

The procedure of Example 1 is repeated except that pinto beans are utilized instead of navy beans and chili sauce is used instead of baked bean sauce.

EXAMPLE 4

The procedure of Example 2 was repeated except that the soak water is additionally changed after 100 minutes at 135° F.

EXAMPLE 5

Navy beans were prepared in the horizontal flow soak tank described hereinabove and in copending application entitled "SOAK APPARATUS FOR LEACHING SOLUBLE CONSTITUENTS FROM INSOLUBLE MATERIALS", the contents of which are incorporated by reference as follows:

700 pounds of dry navy beans were added to 355 gallons of 51.3 ppm calcium carbonate water at 80° F. The water was recirculated at 90 gallons/min. The beans were then heated to 126° F. for 20 minutes (time after achieving 126° F.). The temperature was raised to 129° F. for 39 minutes. The weight content was about 89% of the full hydration weight. The soak water was changed at the end of this step with fresh soft water. The temperature of the soak water was raised to 147° F. and the beans were soaked at that temperature for 24 minutes. The total elapsed time was 122 minutes (including step 1 and heat up time to step 2). After 122 minutes had elapsed, fresh soft water was bled into the tank at 7 gallons/min for an additional 132 minutes at 147° F.

The bleed rate was reduced to 5 gallons/min for 12 additional minutes. The total elapsed time was 4.4 hours. The moisture level was about 51.5% when full hydration was achieved.

The soaked beans were canned with phosphate-added baked bean sauce, sealed and allowed to sit in 150° F. water for 20 min, then retorted. The cooked beans had no oligosaccharides, 83.3% of the starch was gelled, cracks averaged about 9%. A 6 member flatulence panel averaged 5.6 releases during the 8 hour study period.

COMPARATIVE EXAMPLE 1

Leading brands of commercial navy Baked Beans were fed to a panel of adult men and women. The panelists, who had fasted from 11:00 pm the previous night, ate the beans at 8:30 am, and ate no other solid food, and took no liquid beverage except coffee, water, or tea until 4:30 pm. The panelists recorded all incidences of flatulence during the 8 hour evaluation period.

| Product | # of Panelists | Average of flatus incidences over 8 hour evaluation period |
|---|---|---|
| Brand 1 | 57 | 13.0 |
| Brand 1 (repeated) | 53 | 13.0 |
| Brand 2 | 51 | 13.0 |
| Brand 1 (with commercial alpha-galastosidose food enzyme added | 41 | 12.0 |

EXAMPLE 6

371 g of pinto beans were soaked in 1600 ml of soft water at 143° F. for 2 hours. The soak water was replaced with fresh soft water and soaked for 2 more hours. The soak water was changed a second time and soaked for 2 more hours. The soak water was changed a third time but this time with 14.5 g $CaCl_2$ added per liter and soaked for 81 minutes. Finally, the soak water was changed with fresh soft water, soaked for 30 minutes, then blanched at 182° F. for 8 minutes.

The total elapsed time was 522 minutes.

There were no oligosaccharides remaining in the pinto beans.

EXAMPLE 7

371 g pinto beans were soaked in 1500 ml of water, with 85.5 ppm $CaCO_3$ for 58 minutes. The temperature was raised to 140° F. for 148 minutes (elapsed time in bath). The water was changed with fresh soft water and soaked for 117 minutes. The water was changed a second time and soaked at 136° F. for 50 minutes. The beans were blanched at 150° F. for 45 minutes. The total elapsed time was 639 minutes. There were no oligosaccharides present in the legumes.

EXAMPLE 8

700 pounds of dry navy beans were added to 355 gallons of water (68.4 ppm $CaCO_3$) in a horizontal flow soak water tank. Water was recirculated at 60 gallons per minute for 18 minutes at 80° F., (moisture level at the legume was 35%), then for 45 minutes at 120° F. (moisture level at the legume was 49.4%), then 39 minutes at 128° F. (moisture level was 53.8%) (all times are after set point temperatures was achieved).

The temperature was raised to 147° F. After 48 minutes, fresh soft water at 147° F. was bled in for 132 minutes at 3.5 gallons per minute (1.3% per minute of free water). Final bean moisture was 59.0%. The water was drained. Beans were canned with 135° F. baked bean sauce and cooked. Total elapsed time was 242 minutes. Cracks were 10%.

The remaining oligosaccharides in the beans were nil. In a 7 person feeding study, there were 5.7 releases on average.

EXAMPLE 9

700 pounds of dry navy beans were soaked for 12 minutes at 77° F. (68.4 ppm calcium carbonate) in 355 gallons of water, recirculated at 60 gallons per minute. The temperature was raised to 120° F. for 32 minutes (elapsed time), then 126° F. for 16 minutes in step 1. In step 2, the beans were raised to 146° F. for 31 minutes. The free moisture in the balance tank and soak tank was 233 gallons. Fresh soft water was bled in at 7 gallons per minute (3% of free moisture). The temperature was raised to 149° F. for 24 minutes, then lowered to 145° F. for 93 minutes, then lowered again for 15 minutes at 135° F. The bleed-in was terminated. The water was replaced with fresh soft water at 148° F. (90 gallons per minute bleed-in for 6 min). The beans were drained and rinsed in a 2% hexa metaphosphate rinse at 135° F. for 4 minutes. The beans were drained, canned with baked bean sauce and cooked.

Oligosaccharides in the can averaged 0.037%. A 10 person panel averaged 3.75 incidence of flatus in an 8 hour feeding study. Cracks were 15%.

The above preferred embodiments and examples are given to illustrate the scope and spirit of the present invention. These embodiments and examples will make apparent to those skilled in the art other embodiments and examples. These other embodiments and examples are within the contemplation of the present invention.

Therefore, the present invention should be limited only by the appended claims.

What is claimed is:

1. A process for removing oligosaccharide causing flatulence in a legume comprising:
   (a) soaking a legume in a water bath in stagnant, sprayed or flowing water at a first temperature which is above ambient temperatures and below a critical rehydration temperature under conditions effective and for a period of time sufficient to produce a legume having a moisture content of at least 50% of that of a fully hydrated legume;
   (b) soaking and heating the legume of step (a) in said water bath at a second temperature at a pH ranging from about 5.5 to about 9.0 under conditions effective to substantially remove all of the flatulence-causing oligosaccharides therefrom, said second temperature being greater than said critical rehydration temperature and said first temperature, but less than an inactivation temperature of an oligosaccharide reducing enzyme present in the legume.

2. The process according to claim 1 which additionally comprises (c) blanching the legume product of step (b).

3. The process according to claim 1 wherein the legume is a navy bean, pinto bean, kidney bean, white bean, black bean, red bean, lima bean, purple hull bean, garbanzo bean, great northern bean, pink bean, cranberry bean, calico bean, chick peas, black-eye peas, field peas, lentil, soybean, or combination thereof.

4. The process according to claim 1 wherein the water utilized is tap water, deionized water, soft water, distilled water or combination thereof.

5. The process according to claim 1 wherein the water utilized in step (a) has a calcium concentration ranging from 0 ppm to about 120 ppm.

6. The process according to claim 1 wherein step (a) is conducted at a temperature ranging from about 90° F. to about 130° F.

7. The process according to claim 1 wherein step (b) is conducted at a temperature ranging from about 125° F. to about 150° F.

8. The process according to claim 1 wherein step (b) is conducted at a temperature ranging from about 135° F. to about 150° F.

9. The process according to claim 1 wherein step (b) the pH of the soak water ranges from about 6.0 to about 9.0.

10. The process according to claim 1 which additionally comprises preconditioning the legume prior to step (a).

11. The process according to claim 1 wherein step (b) further comprises changing water in the water bath.

12. The process according to claim 11 wherein changing water in the water bath comprises removing water in the water bath and adding fresh water thereto.

13. The process according to claim 11 wherein changing water in the water bath comprises removing water in the water bath and adding fresh water to the water bath, said removal and addition of water being conducted at a rate sufficient to maintain a positive oligosaccharide-concentration difference driving force.

14. The process according to claim 12 wherein changing water comprises removing water in the water bath and adding fresh water to the water bath. said removal and addition of water beina conducted at a rate sufficient to maintain a positive oligosaccharide-concentration difference driving force and minimize rupture or cracking of the skin of the legume.

15. The process according to claim 11 wherein step (b) further comprises:
   (1) removing water in the water bath and adding fresh water to the water bath, said removal and addition of water beina conducted at a rate sufficient to maintain a positive oligosaccharide concentration reduction driving force and minimize rupture or cracking of the legume skin;
   (2) continuing to soak the legume at said second temperature until all of the flatulence-causing oligosaccharides are substantially removed or until there is no longer a positive oligosaccharide concentration reduction driving force, whichever comes first; and
   (3) repeating steps (1) and (2) until substantially all of the flatulence-causing oligosaccharide is removed from the legume.

16. A process for preparing a legume product which comprises:
   (a) soaking a legume in a water bath having stagnant, sprayed or flowing water at a first temperature which is above ambient temperature and below a critical rehydration temperature under conditions effective and for a period of time sufficient to produce a legume having a moisture content of at least about 50% of that of a fully hydrated legume;
   (b) soaking and heating the rehydrated legume of step (a) in said water bath at a second temperature at a pH ranging from about 5.5 to about 9.0 under conditions effective to substantially remove all of the flatulence-causing oligosaccharides therefrom to form a legume product containing substantially no flatulence-causing oligosaccharides, said second temperature being greater than said critical rehydration temperature and said first temperature but less than an inactivation temperature of an oligosaccharide reducing enzyme present in the legume;
   (c) adding a food acceptable vehicle to the product of step (b) containing substantially no flatulence-causing oligosaccharides, to form a legume containing mixture comprising from about 5% by weight to about 75% by legume weight and the remainder being said vehicle; and
   (d) preserving the product of step (c).

17. The process according to claim 16 which additionally comprises blanching the legume product containing substantially no flatulence-causing oligosaccharides prior to adding a food acceptable vehicle thereto.

18. The process according to claim 16 wherein the legume is a navy bean, pinto bean, kidney bean, white bean, black bean, red bean, lima bean, purple hull bean, garbanzo bean, pink bean, cranberry bean, calico bean, chick pea, black-eye pea, field pea, lentil or soybean or combination thereof.

19. A process for preparing a legume product which consists essentially of (a) soaking and heating a cleaned legume in water in a water bath at a first temperature at a pH ranging from about 5.5 to about 9.0 under conditions effective to diffuse the flatulence-causing oligosaccharide from the legume to the water in the water bath and to permit the naturally occurring oligosaccharide reducing enzyme present in the legume to digest the remaining flatulence-causing oligosaccharides present therein to produce a legume that has substantially all of the flatulence-causing oligosaccharides removed therefrom, said first temperature ranging from about 135° F. to about 150° F., and (b) blanching the product of step (a).

20. The process according to claim 19 wherein the legume is heated at a temperature ranging from about 135° F. to about 147° F.

* * * * *